A. L. PARKER.
CRANK LOCKING DEVICE.
APPLICATION FILED DEC. 23, 1919.
1,358,681.
Patented Nov. 9, 1920.
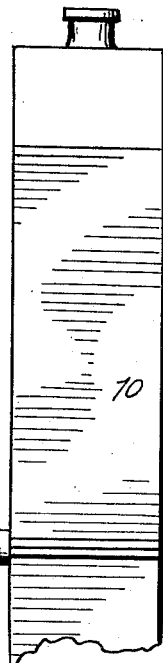
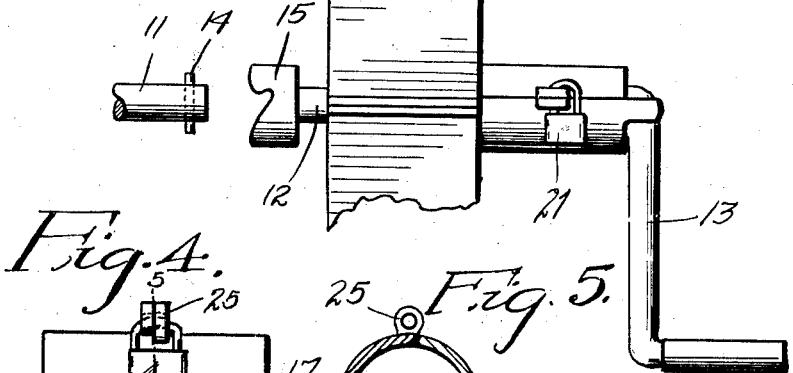
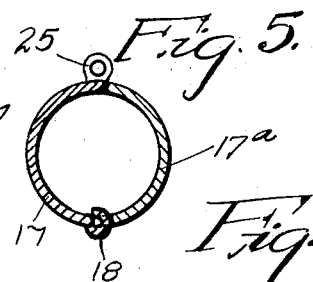
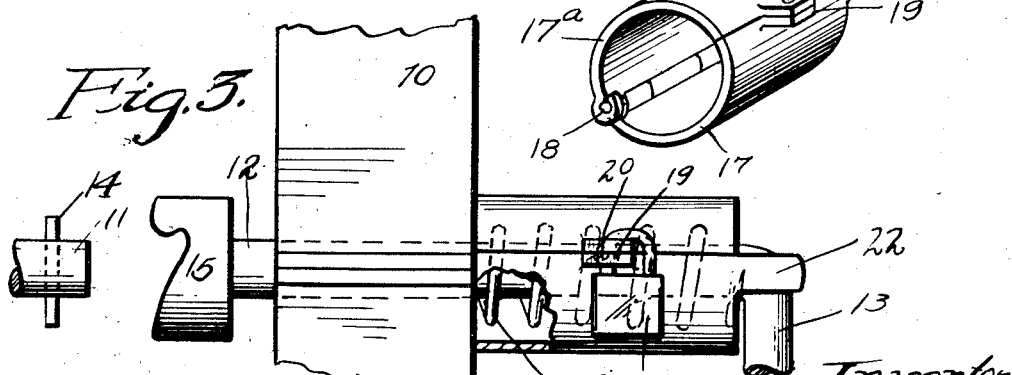
Witness
A. E. Jarvis
Inventor
Arthur L. Parker
By Ourig & Bair
Attys.

UNITED STATES PATENT OFFICE.

ARTHUR L. PARKER, OF DES MOINES, IOWA.

CRANK-LOCKING DEVICE.

1,358,681.  Specification of Letters Patent.  Patented Nov. 9, 1920.

Application filed December 23, 1919. Serial No. 347,036.

*To all whom it may concern:*

Be it known that I, ARTHUR L. PARKER, a citizen of the United States, and resident of Des Moines, in the county of Polk and State of Iowa, have invented a certain new and useful Crank-Locking Device, of which the following is a specification.

The object of my invention is to provide a locking device for clutches, and more particularly for the crank by which an automobile engine is turned over by hand, which device is of extremely simple, durable and inexpensive construction.

More particularly it is my object to provide a locking device of the kind mentioned, peculiarly adapted for use with a sliding shaft connected with a clutch member and adapted to stand between a lateral projection on the shaft and a fixed member adjacent to the shaft, for preventing movement of the shaft in one direction, and thereby preventing the operative engagement of the clutch member on the shaft.

With these and other objects in view, my invention consists in the construction, arrangement and combination of the various parts of the device, whereby the objects contemplated are attained, as hereinafter more fully set forth, pointed out in my claim, and illustrated in the accompanying drawings, in which:

Figure 1 shows a side elevation of the crank of a motor vehicle, equipped with a locking device embodying my invention.

Fig. 2 shows a detail perspective view of my locking device.

Fig. 3 is a detail view, partly in section, illustrating the arrangement of the parts in greater detail than the view shown in Fig. 1.

Fig. 4 is a side elevation of a slightly modified form of my locking device; and Fig. 5 is a detail sectional view, taken on the line 5—5 of Fig. 4.

In the accompanying drawings I have used the reference numeral 10 to indicate generally the radiator of a motor vehicle. The forward end of the engine crank shaft 11 stands just rearwardly of the radiator. Extending through the radiator is a shaft 12, on the forward end of which is the crank arm 13, spaced substantially forwardly of the radiator.

On the adjacent ends of the shafts 11 and 12 are coacting clutch members, which may have a great variety of forms. In the drawings I have shown a pin 14 extended through the shaft 11, and a clutch member 15 on the rear end of the shaft 12, adapted to receive and engage the pin 14 when the shaft 12 is shoved rearwardly and rotated.

The shaft 12 is normally held at its forward position of movement, with the clutch members out of engagement with each other, by means of a spring 16 interposed between the radiator or fixed member 10 and the crank arm 13.

In cranking the engine, the operator grasps the handle of the crank 13 and shoves the shaft 12 rearwardly until the clutch member 15 projects over the adjacent end of the shaft 11 in coacting position with relation to the pin 14. The operator then rotates the shaft 12 by means of the crank handle, and the engagement of the clutch member 15 with the coacting clutch member or pin 14 imparts rotation to the shaft 11 for turning the engine over. As soon as the operator releases his grip on the crank handle, the spring 16 will shove the shaft 12 forwardly for throwing the clutch members out of engagement.

For positively locking the shaft 14 in its forward position of movement, and thereby preventing the engagement of the clutch members 14 and 15 for the purpose of preventing the starting of the engine by unauthorized persons, I have provided the following locking device:

I employ a two-part cylindrical sleeve or locking member comprising the opposite halves 17 and 17$^a$, hinged together at 18 along one side, and having on their opposite edges corresponding projecting ears 19 and 19$^a$. The ears 19 and 19$^a$ are formed with openings 20 which register with each other when the locking device is in closed position.

The cylindrical locking device is designed to be placed on, and to receive, the spring 16 and the portion of the shaft 14 in front of the radiator 10, as illustrated in Figs. 1 and 3. It is desirable that the ears 19 and 19$^a$ should be readily accessible at all times, in order that they may be locked together by means of the shackle of a padlock 21.

I have provided simple means for holding the ears in substantially horizontal position projecting laterally. The cylindrical locking device has at one end, at its opposite sides, ears or lugs 22, which, when the device is installed on the shaft 12, as shown in Fig. 1, extend forwardly on opposite sides of the crank arm 13. When the padlock 21 is installed in position, it will be seen that gravity will tend to cause it to drop downwardly. The ears 22 engage the crank arm 13 and prevent such downward movement. By means of these ears, the ears 19 and 19$^a$ are held in position projecting laterally, as shown in Figs. 1 and 3, for permitting ready access to the padlock.

Insomuch as the crank arm will always hang downwardly, the lock device will always assume substantially the same position on the shaft 12.

The locking device is of such length that when installed on the shaft 14 it will be interposed between the radiator 10 and the crank arm 13, and will effectually prevent such rearward movement of the shaft 12 as to permit the engagement of the clutch members.

In Figs. 4 and 5 I have shown a slightly modified form of my locking device, in which the ears 22 are omitted, and instead of the ears 19 and 19$^a$, the members 17 and 17$^a$ are provided with ears 25 which overlap each other but are arranged in different planes from the ears 19 and 19$^a$.

It will be seen that my invention may be embodied in a variety of forms without departing from the real spirit and purpose of my invention, and within the scope of my claim. My device might be readily used for locking clutch members other than those connected with the crank of an automobile.

I claim as my invention:

A crank lock adapted to positively hold the crank and crank shaft of an automobile out of engagement with each other, said crank lock being a cylindrical sleeve comprising two semi-cylindrical members hinged together on one of their sides, and formed with ears on their other sides, said ears being formed with registering openings for receiving a padlock, and forwardly projecting lugs formed on said sleeve, adapted to extend on either side of the downwardly extending portion of said crank, whereby said lock will be held against rotation relative to said crank.

Des Moines, Iowa, November 25, 1919.

ARTHUR L. PARKER.